United States Patent [19]
Miyauchi

[11] Patent Number: 5,777,799
[45] Date of Patent: Jul. 7, 1998

[54] THREE-LENS-GROUP ZOOM LENS SYSTEM HAVING A ZOOM RATIO EXCEEDING 3.5

[75] Inventor: Yuji Miyauchi, Machida, Japan

[73] Assignee: Olympus Optical Co., Ltd., Tokyo, Japan

[21] Appl. No.: 684,927

[22] Filed: Jul. 19, 1996

[30] Foreign Application Priority Data

Jul. 21, 1995 [JP] Japan ..................... 7-185872

[51] Int. Cl.$^6$ ..................... G02B 15/14
[52] U.S. Cl. ..................... 359/689; 359/676
[58] Field of Search ..................... 359/689, 686, 359/676, 791, 681, 682

[56] References Cited

U.S. PATENT DOCUMENTS

| | | | |
|---|---|---|---|
| 4,978,204 | 12/1990 | Ito | 359/689 |
| 4,983,027 | 1/1991 | Kojima et al. | 359/689 |
| 5,033,832 | 7/1991 | Ito | 359/689 |
| 5,105,311 | 4/1992 | Tokumaru et al. | 359/686 |
| 5,218,476 | 6/1993 | Ito | 359/676 |
| 5,523,888 | 6/1996 | Nishio | 359/686 |

FOREIGN PATENT DOCUMENTS

| | | | |
|---|---|---|---|
| 2-73211 | 3/1990 | Japan. | |
| 2-135312 | 5/1990 | Japan. | |
| 5-27176 | 2/1993 | Japan. | |
| 6-59192 | 3/1994 | Japan. | |
| 6-67093 | 3/1994 | Japan. | |
| 6-75166 | 3/1994 | Japan | 359/689 |
| 6-95039 | 4/1994 | Japan. | |
| 7-181388 | 7/1995 | Japan. | |

*Primary Examiner*—Georgia Y. Epps
*Assistant Examiner*—Jordan M. Schwartz
*Attorney, Agent, or Firm*—Cushman Darby Cushman IP Group of Pillsbury Madison & Sutro LLP

[57] ABSTRACT

The invention provides a three-lens-group zoom lens system which, albeit having a zoom ratio of 3.5 or even more, is compact, well corrected for various aberrations including chromatic aberration and distortion, and excellent in the ability to form images, comprises, in order from an object side, a first lens group G1 having positive refracting power, a second lens group G2 having positive refracting power and a third lens group G3 having negative refracting power, in which, in zooming from a wide-angle side to a telephoto side, an air separation between the first and second lens groups G1 and G2 increases while an air separation between the second and third lens groups G2 and G3 decreases. The first lens group G1 comprises, in order from the object side, a double concave lens, a positive lens and a positive lens, and satisfies the following conditions (1) and (2):

$$-2.0 < f_w/r_1 < -0.5 \qquad (1)$$

$$-2.0 < f_1/f_a < -0.2 \qquad (2)$$

where $f_w$ is the composite focal length of the overall system at a wide-angle end, $r_1$ is the radius of curvature of a surface of the first lens that is located on the object side, $f_1$ is the composite focal length of the first lens group, and $f_a$ is the composite focal length of the double concave lens that is the first lens and the positive lens that is the second lens in the first lens group.

22 Claims, 2 Drawing Sheets

THREE-LENS-GROUP ZOOM LENS SYSTEM HAVING A ZOOM RATIO EXCEEDING 3.5

BACKGROUND OF THE INVENTION

The present invention relates generally to a three-lens-group zoom lens system having a high zoom ratio, and more particularly to a compact, three-lens-group zoom lens system having a high zoom ratio, which is suitable for use on lens shutter cameras.

In recent years, zoom lenses having high zoom ratios have also been built in lens shutter cameras, and zoom lenses having a zoom ratio of 3 or even more are now in increasing demand.

So far, various types of zoom lenses have been known for use on lens shutter cameras. Among these there are three-lens-group zoom lenses having a zoom ratio of 3 or more, as disclosed typically in JP-A-2-135312 and JP-A-6-67093 filed by the applicant.

Referring here to a three-lens-group zoom lens designed to have a positive, positive and negative power distribution, when the overall lens length at its telephoto end in particular is reduced while the zoom ratio of such an optical system is increased, it is important that the focal length of the first lens group be reduced while various aberrations including chromatic aberration are kept well balanced.

JP-A-6-67093 discloses a zoom lens system comprising a positive lens group, a positive lens group and a negative lens group wherein the first lens group consists of one positive lens and one negative lens. To shorten the focal length of the first lens group, it is required to diminish the power of the negative lens in the first lens group. However, this makes the ability of the negative lens to correct chromatic aberration insufficient, and so renders it difficult to maintain adequate performance.

JP-A-2-135312 discloses a zoom lens system comprising a positive lens group, a positive lens group and a negative lens group with the first lens group made up of three lenses. However, a reduction of the focal length of the first lens group causes a decrease in the back focus at the wide-angle end in particular, leading to an increase in the diameter of the lens located nearer to an image surface.

In regard to a problem involved inherently in a three-lens-group zoom lens having a positive, positive and negative power distribution, it is important to eliminate plus distortion occurring at the wide-angle end.

SUMMARY OF THE INVENTION

In view of the aforesaid problems associated with the prior art, an object of the present invention is to provide a three-lens-group zoom lens system which, albeit having a zoom ratio of 3.5 or even more, is compact, well corrected for various aberrations inclusive of chromatic aberration and distortion, and excellent in the ability to form images.

According to one aspect of the present invention, the aforesaid object is achieved by the provision of a three-lens-group zoom lens system having a high zoom ratio which comprises, in order from an object side, a first lens group having positive refracting power, a second lens group having positive refracting power and a third lens group having negative refracting power and in which, in zooming from a wide-angle side to a telephoto side, an air separation between the first and second lens groups increases while an air separation between the second and third lens groups decreases, characterized in that said first lens group comprises, in order from the object side, a first subgroup consisting of a cemented lens of a double concave lens and a double convex lens, and a second subgroup consisting of a double convex lens, three lenses in all.

According to another aspect of the present invention, there is provided a three-lens-group zoom lens system having a high zoom ratio which comprises, in order from an object side, a first lens group having positive refracting power, a second lens group having positive refracting power and a third lens group having negative refracting power and in which, in zooming from a wide-angle side to a telephoto side, an air separation between the first and second lens groups increases while an air separation between the second and third lens groups decreases, characterized in that said first lens group comprises, in order from the object side, a first subgroup consisting of a cemented lens of a double concave lens and a double convex lens, and a second subgroup consisting of a positive lens, three lenses in all, and satisfies the following condition (1):

$$-2.0 < f_w/r_1 < -0.5 \qquad (1)$$

where $f_w$ is the composite focal length of the overall system at a wide-angle end and $r_1$ is the radius of curvature of a surface of said first lens that is located on the object side.

According to still another aspect of the present invention, there is provided a three-lens-group zoom lens system having a high zoom ratio which comprises, in order from an object side, a first lens group having positive refracting power, a second lens group having positive refracting power and a third lens group having negative refracting power and in which, in zooming from a wide-angle side to a telephoto side, an air separation between the first and second lens groups increases while an air separation between the second and third lens groups decreases, characterized in that said first lens group comprises, in order from the object side, a first lens that is a double concave lens, a second lens that is a positive lens and a third lens that is a positive lens, three lenses in all, and satisfies the following conditions (1) and (2):

$$-2.0 < f_w/r_1 < -0.5 \qquad (1)$$

$$-2.0 < f_1/f_a < -0.2 \qquad (2)$$

where $f_w$ is the composite focal length of the overall system at a wide-angle end, $r_1$ is the radius of curvature of a first lens surface, $f_1$ is the composite focal length of the first lens group, and $f_a$ is the composite focal length of the double concave lens that is the first lens and the positive lens that is the second lens in the first lens group.

In the third aspect of the present invention, the first lens group may comprise, in order from the object side, a double concave lens, a double convex lens and a positive lens, three lenses in all. Alternatively, the first lens group may comprise, in order from the object side, a double concave lens, a double convex lens and a double convex lens, three lenses in all.

Why the aforesaid arrangements or layouts are used and how they work will now be explained.

As already mentioned with reference to a three-lens-group zoom lens system having a positive, positive and negative power distribution, when it is intended to shorten the overall lens length at the telephoto end in particular while the zoom ratio of the optical system is kept high, it is important that the focal length of the first lens group be reduced while chromatic aberration is kept in a well-balanced state.

In order for the three-lens-group zoom lens system according to the first aspect of the present invention to have an enhanced effect on correction of chromatic aberration, it is required to increase the power of the double concave lens in the first lens group to a certain level. As the power of the double concave lens increases, restrictions on manufacturing tolerances such as decentering tolerance of lenses and figure tolerance become severe, but restrictions on manufacturing tolerances for cemented lenses such as one of the double concave lens that is the first lens and the positive lens that is the second lens are lightened.

When the focal length of the first lens group is shortened while the power of the double concave lens is kept strong, it is desired that both the positive lenses that are the second and third lenses be in double convex forms so that positive power is properly distributed thereto, to thereby make adequate correction for various aberrations including spherical aberration and lighten restrictions on manufacturing tolerances.

With the three-lens-group zoom lens system according to the first aspect of the present invention wherein the first lens group comprises, in order from the object side, a first subgroup consisting of a cemented lens of a double concave lens and a double convex lens and a second subgroup consisting of a double convex lens, three lenses in all, it is possible to make satisfactory correction for various aberrations including chromatic aberration and lighten restrictions on manufacturing tolerances, even when the focal length of the first lens group is shortened.

In order for the three-lens-group zoom lens system according to the second aspect of the present invention to have an enhanced effect on correction of chromatic aberration, it is required to increase the power of the double concave lens in the first lens group to a certain level, as already mentioned. As the power of the double concave lens increases, restrictions on manufacturing tolerances such as decentering tolerance of lenses and figure tolerance become severe, but restrictions on manufacturing tolerances for cemented lenses such as one of the double concave lens and the positive lens that is the second lens are lightened.

In the three-lens-group zoom lens system according to the second aspect of the present invention, the first lens surface is designed as a concave surface having a relatively small radius of curvature so that the system is free of plus distortion at the wide-angle end, and negative power is assigned to a lens located as near to the object side as possible so that some back focus can be available at the wide-angle end in particular. To achieve this, it is desired that the following condition (1) be satisfied.

$$-2.0 < f_w/r_1 < -0.5 \qquad (1)$$

where $f_w$ is the composite focal length of the overall system at the wide-angle end and $r_1$ is the radius of curvature of the surface of said first lens that is located on the object side.

Condition (1) defines the relation between the focal length of the overall system at the wide-angle end and the radius of curvature of the first lens surface. Upon the upper limit of −0.5 of this condition being exceeded, the system has a short back focus at the wide-angle end, resulting in an increase in the diameter of the lens located on the image surface side and insufficient correction of distortion at the wide-angle end. When the lower limit of −2.0 in condition (1) is not reached, on the other hand, the leaping-up of an axial bundle at the first lens surface becomes too strong, resulting in an increase in the amount of spherical aberration produced at the first lens surface, which otherwise makes correction of spherical aberration difficult.

With the three-lens-group zoom lens system according to the second aspect of the present invention wherein the first lens group comprises, in order from the object side, a first subgroup consisting of a cemented lens of a double concave lens and a double convex lens, and a second subgroup consisting of a positive lens, it is possible to maintain the ability to correct chromatic aberration, even when the focal length of the first lens group is shortened. By permitting the radius of curvature of the first lens surface to have a proper value, it is possible to eliminate plus distortion at the wide-angle end and achieve some back focus at the wide-angle end in particular.

In the three-lens-group zoom lens system according to the third aspect of the present invention, the first lens group is made up of, in order from the object side, a double concave lens, a positive lens and a positive lens and the first lens surface is designed as a concave surface having a relatively small radius of curvature so that the system is free of plus distortion at the wide-angle end, and negative power is assigned to a lens located as near to the object side as possible so that some back focus can be available at the wide-angle end in particular. Further, the three-lens-group zoom lens system according to the third aspect of the present invention is allowed to maintain the ability to correct chromatic aberration by making the powers of the lenses in the first lens group have proper values. To achieve this, it is desired that the following conditions (1) and (2) be satisfied.

$$-2.0 < f_w/r_1 < -0.5 \qquad (1)$$

$$-2.0 < f_1/f_a < -0.2 \qquad (2)$$

where $f_w$ is the composite focal length of the overall system at the wide-angle end, $r_1$ is the radius of curvature of the surface of said first lens that is located on the object side, $f_1$ is the composite focal length of the first lens group, and $f_a$ is the composite focal length of the double concave lens that is the first lens and the positive lens that is the second lens in the first lens group.

Condition (1) defines the relation between the focal length of the overall system at the wide-angle end and the radius of curvature of the first lens surface. Upon the upper limit of −0.5 of this condition being exceeded, the system has a short back focus at the wide-angle end, resulting in an increase in the diameter of the lens located on the image surface side and insufficient correction of distortion at the wide-angle end. When the lower limit of −2.0 in condition (1) is not reached, on the other hand, the leaping-up of an axial bundle at the first lens surface becomes too strong, resulting in an increase in the amount of spherical aberration produced at the first lens surface, which otherwise makes correction of spherical aberration difficult.

Condition (2) defines the relation between the composite focal length of the first lens group and the composite focal length of the double concave lens or the first lens and the positive lens or the second lens in the first lens group. Upon the upper limit of −0.2 of this condition being exceeded, the effect of the double concave lens (i.e., the first lens) on correction of chromatic aberration becomes insufficient and correction of chromatic aberration becomes insufficient throughout the system. When the lower limit of −2.0 in condition (2) is not reached, on the other hand, the power of the third lens becomes too strong, again making correction of chromatic aberration difficult.

When the focal length of the first lens group is shortened while the power of the double concave lens is kept strong, it is desired that both the positive lenses that are the second and third lenses be in double convex forms so that positive power is properly distributed thereto, to thereby make goodenough correction for various aberrations and lighten restrictions on manufacturing tolerances.

In the three-lens-group zoom lens system according to the third aspect of the present invention wherein the first lens group comprises, in order from the object side, a double concave lens, a positive lens and a positive lens, three lenses in all, it is possible to make the powers of the lenses in the first lens group have proper values, thereby maintaining the ability to correct chromatic aberration, even when the focal length of the first lens group is shortened. By allowing the radius of curvature of the first lens surface to have a proper value, it is further possible to eliminate plus distortion at the wide-angle end and make some back focus available at the wide-angle end in particular.

When the power of the double concave lens in the first lens group is increased to enhance the effect on correction of chromatic aberration, restrictions on manufacturing tolerances such as decentering tolerance of lenses and figure tolerance become severe. It is thus desired that the double concave lens and the positive lens that is the second lens be cemented together into a cemented lens, thereby lightening restrictions on manufacturing tolerances.

When the focal length of the first lens group is shortened while the power of the double concave lens is kept strong, it is desired that both the positive lenses that are the second and third lenses be in double convex forms so that the positive power is properly distributed thereto, to thereby make adequate correction for various aberrations and lighten restrictions on manufacturing tolerances.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

The three-lens-group zoom lens system having a high zoom ratio according to the present invention will now be explained more specifically with reference to Examples 1 to 4.

Figure 1:
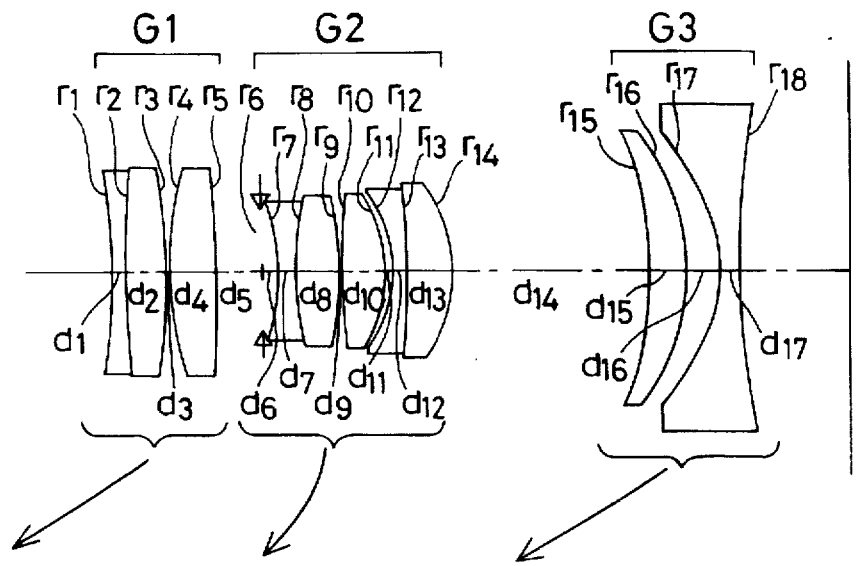
FIG. 1 a sectional schematic of Example 1 of the present zoom lens at a wide-angle end thereof.
Figure 2:
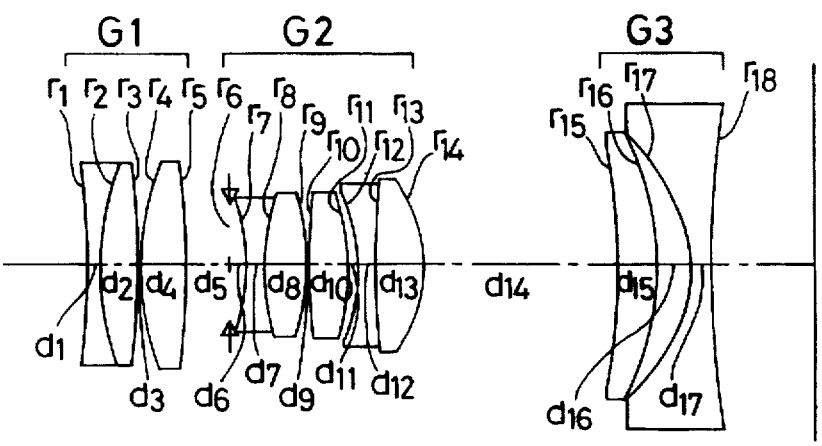
FIG. 2 is a sectional schematic of Example 2 of the present zoom lens system at a wide-angle end thereof.
Figure 3:
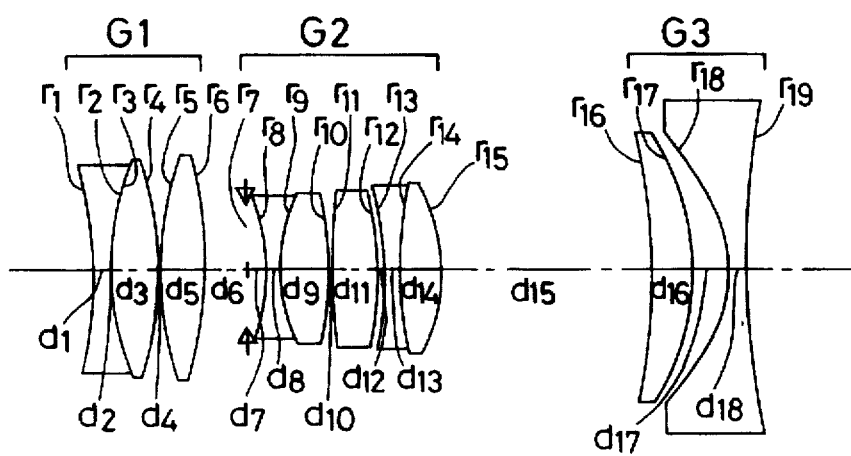
FIG. 3 is a sectional schematic of Example 3 of the present zoom lens system at a wide-angle end thereof.

Presented in FIGS. 1 to 3 are sectional schematics of Examples 1 to 3 of the present zoom lens system at wide-angle ends thereof. Example 4 is not illustrated because of being similar in arrangement to Example 2.

In Example 1, as shown in FIG. 1, a first lens group G1 of positive refracting power consists of a cemented lens of double-concave and -convex lens elements and a double convex lens, a second lens group G2 of positive refracting power has a stop at the forefront surface and consists of a cemented lens of double-concave and -convex lens elements, a double convex lens and a cemented lens of a negative meniscus lens element convex on an image surface side and a positive meniscus lens element convex on the image surface side, and a third lens group G3 of negative refracting power consists of a positive meniscus lens convex on the image surface side and a double concave lens. In zooming from a wide-angle side to a telephoto side, the lens groups are moved toward an object side while an air separation between the first and second lens groups G1 and G2 increases with a decrease in an air separation between the second and third lens groups G2 and G3. (This will be true of Examples 2 and 3 as well.) Four aspheric surfaces are used, two for both surfaces of the double convex lens sandwiched between the cemented lenses in the second lens group G2; one for a front surface of the positive meniscus lens in the third lens group G3; and one for a front surface of the double concave lens in the third lens group G3.

In Example 2 or 4, as can be seen from FIG. 2, a first lens group G1 of positive refracting power consists of a cemented lens of double-concave and -convex lens elements and a double convex lens, a second lens group G2 of positive refracting power has a stop at the forefront surface and consists of a cemented lens of double-concave and -convex lens elements, a double convex lens and a cemented lens of double-concave and -convex lens elements, and a third lens group G3 of negative refracting power consists of a positive meniscus lens convex on an image surface side and a double concave lens. In Example 2 three aspheric surfaces are used, one for a rear surface of the double convex lens sandwiched between the cemented lenses in the second lens group G2; one for a front surface of the positive meniscus lens in the third lens group G3; and one for a front surface of the double concave lens. In Example 4 five aspheric surfaces are used, one for the forefront surface of the cemented lens located in the rear of the stop in the second lens group G2; two for both surfaces of the double convex lens sandwiched between the cemented lenses in the second lens group G2; one for a front surface of the positive meniscus lens in the third lens group G3; and one for a front surface of the double concave lens in the third lens group G3.

In Example 3, as illustrated in FIG. 3, a first lens group G1 of positive refracting power consists of a double concave lens, a double convex lens and a double convex lens, a second lens group G2 has a stop at the forefront surface and consists of a cemented lens of double-concave and -convex lens elements, a double convex lens and a cemented lens of double-concave and -convex lens elements, and a third lens group G3 of negative refracting power consists of a positive meniscus lens convex on an image surface side and a double concave lens. Four aspheric surfaces are used, two for both surfaces of the double convex lens sandwiched between the cemented lenses in the second lens group G2; one for a front surface of the positive meniscus lens in the third lens group G3; and one for a front surface of the double concave lens in the third lens group G3.

Enumerated below are numerical data for the aforesaid examples. Symbols used hereinafter but not hereinbefore have the following meanings:

f is the focal length of the overall system;
$F_{NO}$ is the F-number;
$2\omega$ is the field angle;
$f_B$ is the back focus;
$r_1, r_2, \ldots$ are the radii of curvature of lens surfaces;
$d_1, d_2, \ldots$ are the spacings between lens surfaces;
$n_{d1}, n_{d2}, \ldots$ are the d-line refractive indices of lenses, and $v_{d1}, v_{d2}, \ldots$ are the Abbe's number of lenses. Here let x represent an optical axis with the direction of propagation of light having a plus sign and y a direction perpendicular to the optical axis. Aspheric geometry is then given by $$x=(y^2/r)/\{1+\{1-(K+1)(y/r)^2\}^{1/2}\}+A_4y^4+A_6y^6+A_8y^8+A_{10}y^{10}$$

where r is the paraxial radius of curvature, K is the conical coefficient, and $A_4$, $A_6$, $A_8$ and $A_{10}$ are the fourth, sixth, eighth and tenth aspherical coefficients.

Example 1 f = 39.00~72.87~145.00
$F_{NO}$ = 3.48~6.14~10.17
2ω = 58.16°~32.49°~16.70°
$f_B$ = 9.78~38.00~84.96

| | | | |
|---|---|---|---|
| $r_1$ = −64.897 | $d_1$ = 1.20 | $n_{d1}$ = 1.83400 | $v_{d1}$ = 37.17 |
| $r_2$ = 104.299 | $d_2$ = 3.60 | $n_{d2}$ = 1.64328 | $v_{d2}$ = 47.85 |
| $r_3$ = −56.711 | $d_3$ = 0.20 | | |
| $r_4$ = 35.515 | $d_4$ = 4.20 | $n_{d3}$ = 1.48749 | $v_{d3}$ = 70.21 |
| $r_5$ = −184.792 | $d_5$ = (Variable) | | |
| $r_6$ = ∞(Stop) | $d_6$ = 1.50 | | |
| $r_7$ = −16.312 | $d_7$ = 1.20 | $n_{d4}$ = 1.77250 | $v_{d4}$ = 49.60 |
| $r_8$ = 24.113 | $d_8$ = 4.00 | $n_{d5}$ = 1.72825 | $v_{d5}$ = 28.46 |
| $r_9$ = −35.653 | $d_9$ = 0.20 | | |
| $r_{10}$ = 76.534 (Aspheric) | $d_{10}$ = 4.00 | $n_{d6}$ = 1.56384 | $v_{d6}$ = 60.70 |
| $r_{11}$ = −11.699 (Aspheric) | $d_{11}$ = 0.80 | | |
| $r_{12}$ = −10.971 | $d_{12}$ = 1.20 | $n_{d7}$ = 1.78472 | $v_{d7}$ = 25.68 |
| $r_{13}$ = −64.816 | $d_{13}$ = 4.00 | $n_{d8}$ = 1.72916 | $v_{d8}$ = 54.68 |
| $r_{14}$ = −13.244 | $d_{14}$ = (Variable) | | |
| $r_{15}$ = −41.453 (Aspheric) | $d_{15}$ = 3.40 | $n_{d9}$ = 1.80518 | $v_{d9}$ = 25.43 |
| $r_{16}$ = −19.110 | $d_{16}$ = 3.01 | | |
| $r_{17}$ = −13.211 (Aspheric) | $d_{17}$ = 1.80 | $n_{d10}$ = 1.72916 | $v_{d10}$ = 54.68 |
| $r_{18}$ = 78.906 | | | |

Zooming Spaces

| f | 39.00 | 72.87 | 145.00 |
|---|---|---|---|
| $d_5$ | 4.00 | 7.74 | 18.33 |
| $d_{14}$ | 17.44 | 8.35 | 1.67 |

Aspherical Coefficients

10th surface

K = 0.0000
$A_4$ = −5.5093 × 10⁻⁵
$A_6$ = 7.7528 × 10⁻⁶
$A_8$ = −2.4075 × 10⁻⁷
$A_{10}$ = 2.7597 × 10⁻⁹

11th surface

K = 0.0000
$A_4$ = 2.1995 × 10⁻⁵
$A_6$ = 7.8032 × 10⁻⁶
$A_8$ = −2.4501 × 10⁻⁷
$A_{10}$ = 2.8604 × 10⁻⁹

15th surface

K = −0.1312
$A_4$ = 1.0339 × 10⁻⁵
$A_6$ = −7.2126 × 10⁻⁷
$A_8$ = 7.5599 × 10⁻⁹
$A_{10}$ = −2.9398 × 10⁻¹¹

17th surface

K = −0.7595
$A_4$ = −2.0895 × 10⁻⁵
$A_6$ = 1.1188 × 10⁻⁶
$A_8$ = −9.4510 × 10⁻⁹
$A_{10}$ = −2.9644 × 10⁻¹¹

(1) $f_w/r_1$ = −0.601
(2) $f_1/f_a$ = −0.206

Example 2 f = 39.00~72.87~145.00
$F_{NO}$ = 3.80~5.80~10.10
2ω = 57.16°~32.45°16.80°
$f_B$ = 9.48~30.16~74.61

| | | | |
|---|---|---|---|
| $r_1$ = −67.092 | $d_1$ = 1.20 | $n_{d1}$ = 1.83400 | $v_{d1}$ = 37.17 |
| $r_2$ = 25.741 | $d_2$ = 3.30 | $n_{d2}$ = 1.54814 | $v_{d2}$ = 45.78 |
| $r_3$ = −63.080 | $d_3$ = 0.20 | | |
| $r_4$ = 25.642 | $d_4$ = 3.80 | $n_{d3}$ = 1.51742 | $v_{d3}$ = 52.42 |
| $r_5$ = −92.552 | $d_5$ = (Variable) | | |
| $r_6$ = ∞ (Stop) | $d_6$ = 1.50 | | |
| $r_7$ = −16.418 | $d_7$ = 1.20 | $n_{d4}$ = 1.77250 | $v_{d4}$ = 49.60 |
| $r_8$ = 18.249 | $d_8$ = 4.00 | $n_{d5}$ = 1.72825 | $v_{d5}$ = 28.46 |
| $r_9$ = −23.817 | $d_9$ = 0.20 | | |
| $r_{10}$ = 71.095 | $d_{10}$ = 3.73 | $n_{d6}$ = 1.56384 | $v_{d6}$ = 60.70 |
| $r_{11}$ = −16.579 (Aspheric) | $d_{11}$ = 0.99 | | |
| $r_{12}$ = −14.267 | $d_{12}$ = 1.20 | $n_{d7}$ = 1.80518 | $v_{d7}$ = 25.43 |
| $r_{13}$ = 73.820 | $d_{13}$ = 4.09 | $n_{d8}$ = 1.69680 | $v_{d8}$ = 55.53 |
| $r_{14}$ = −14.288 | $d_{14}$ = (Variable) | | |
| $r_{15}$ = −65.770 (Aspheric) | $d_{15}$ = 3.85 | $n_{d9}$ = 1.80518 | $v_{d9}$ = 25.43 |
| $r_{16}$ = −24.688 | $d_{16}$ = 2.88 | | |
| $r_{17}$ = −13.055 (Aspheric) | $d_{17}$ = 1.85 | $n_{d10}$ = 1.72916 | $v_{d10}$ = 54.68 |
| $r_{18}$ = 97.231 | | | |

Zooming Spaces

| f | 39.00 | 72.87 | 145.00 |
|---|---|---|---|
| $d_5$ | 4.02 | 17.89 | 25.52 |
| $d_{14}$ | 17.32 | 8.42 | 1.90 |

Aspherical Coefficients

11th surface

K = −0.1756
$A_4$ = 4.4488 × 10⁻⁵
$A_6$ = 1.5494 × 10⁻⁸
$A_8$ = 8.7485 × 10⁻¹¹
$A_{10}$ = 1.7197 × 10⁻¹¹

15th surface

K = 0.5740
$A_4$ = 1.1289 × 10⁻⁵
$A_6$ = −1.3526 × 10⁻⁷
$A_8$ = 1.2966 × 10⁻⁹
$A_{10}$ = 0

17th surface

K = −0.8667
$A_4$ = −3.2728 × 10⁻⁶
$A_6$ = 2.1171 × 10⁻⁷
$A_8$ = −2.0749 × 10⁻⁹
$A_{10}$ = 0

(1) $f_w/r_1$ = −0.581
(2) $f_1/f_a$ = −1.125

Example 3 f = 39.00~82.61~175.00
$F_{NO}$ = 3.71~7.00~11.98
2ω = 58.41°~28.52°~13.91°
$f_B$ = 9.88~39.52~98.16

| | | | |
|---|---|---|---|
| $r_1$ = −35.051 | $d_1$ = 1.20 | $n_{d1}$ = 1.83400 | $v_{d1}$ = 37.17 |
| $r_2$ = 23.885 | $d_2$ = 0.10 | | |
| $r_3$ = 23.983 | $d_3$ = 4.05 | $n_{d2}$ = 1.54814 | $v_{d2}$ = 45.78 |
| $r_4$ = −34.189 | $d_4$ = 0.20 | | |
| $r_5$ = 30.343 | $d_5$ = 4.05 | $n_{d3}$ = 1.51742 | $v_{d3}$ = 52.42 |
| $r_6$ = −38.146 | $d_6$ = (Variable) | | |
| $r_7$ = ∞ (Stop) | $d_7$ = 1.50 | | |
| $r_8$ = −18.069 | $d_8$ = 1.20 | $n_{d4}$ = 1.77250 | $v_{d4}$ = 49.60 |
| $r_9$ = 16.571 | $d_9$ = 4.15 | $n_{d5}$ = 1.72825 | $v_{d5}$ = 28.46 |

-continued

| | | | |
|---|---|---|---|
| $r_{10} = -31.048$ | $d_{10} = 0.20$ | | |
| $r_{11} = 75.990$ (Aspheric) | $d_{11} = 4.16$ | $n_{d6} = 1.56384$ | $v_{d6} = 60.70$ |
| $r_{12} = -26.235$ (Aspheric) | $d_{12} = 0.80$ | | |
| $r_{13} = -20.768$ | $d_{13} = 1.20$ | $n_{d7} = 1.80518$ | $v_{d7} = 25.43$ |
| $r_{14} = 33.557$ | $d_{14} = 3.98$ | $n_{d8} = 1.69680$ | $v_{d8} = 55.53$ |
| $r_{15} = -14.794$ | $d_{15} =$ (Variable) | | |
| $r_{16} = -57.277$ (Aspheric) | $d_{16} = 3.85$ | $n_{d9} = 1.80518$ | $v_{d9} = 25.43$ |
| $r_{17} = -23.333$ | $d_{17} = 2.94$ | | |
| $r_{18} = -13.492$ (Aspheric) | $d_{18} = 1.85$ | $n_{d10} = 1.72916$ | $v_{d10} = 54.68$ |
| $r_{19} = 77.312$ | | | |

| Zooming Spaces | | | |
|---|---|---|---|
| f | 39.00 | 82.61 | 175.00 |
| $d_5$ | 4.00 | 14.94 | 22.44 |
| $d_{14}$ | 18.56 | 7.80 | 1.00 |

Aspherical Coefficients

11th surface $K = -3.6194$
$A_4 = -8.6967 \times 10^{-6}$
$A_6 = 1.7560 \times 10^{-6}$
$A_8 = -3.6618 \times 10^{-8}$
$A_{10} = 1.1187 \times 10^{-10}$ 12th surface $K = -0.1399$
$A_4 = 3.8232 \times 10^{-5}$
$A_6 = 2.1833 \times 10^{-6}$
$A_8 = -4.7190 \times 10^{-8}$
$A_{10} = 2.4712 \times 10^{-10}$ 16th surface $K = 0.5256$
$A_4 = 1.2519 \times 10^{-5}$
$A_6 = -1.5347 \times 10^{-7}$
$A_8 = 6.8980 \times 10^{-10}$
$A_{10} = 0$ 18th surface $K = -0.8268$
$A_4 = 1.2225 \times 10^{-5}$
$A_6 = 2.9926 \times 10^{-7}$
$A_8 = -1.1295 \times 10^{-9}$
$A_{10} = 0$
(1) $f_w/r_1 = -1.113$
(2) $f_1/f_a = -1.113$ Example 4 f = 39.00~87.00~195.00
$F_{NO}$ = 3.70~6.81~12.77
2ω = 56.89°~26.92°~12.53°
$f_B$ = 9.84~40.82~103.68

| | | | |
|---|---|---|---|
| $r_1 = -34.582$ | $d_1 = 1.20$ | $n_{d1} = 1.83400$ | $v_{d1} = 37.17$ |
| $r_2 = 22.806$ | $d_2 = 4.05$ | $n_{d2} = 1.54814$ | $v_{d2} = 45.78$ |
| $r_3 = -34.307$ | $d_3 = 0.20$ | | |
| $r_4 = 28.254$ | $d_4 = 4.05$ | $n_{d3} = 1.51742$ | $v_{d3} = 52.42$ |
| $r_5 = -36.587$ | $d_5 =$ (Variable) | | |
| $r_6 = \infty$ (Stop) | $d_6 = 1.50$ | | |
| $r_7 = -17.477$ (Aspheric) | $d_7 = 1.20$ | $n_{d4} = 1.77250$ | $v_{d4} = 49.60$ |
| $r_8 = 15.261$ | $d_8 = 4.15$ | $n_{d5} = 1.72825$ | $v_{d5} = 28.46$ |
| $r_9 = -31.063$ | $d_9 = 0.20$ | | |
| $r_{10} = 76.964$ (Aspheric) | $d_{10} = 4.16$ | $n_{d6} = 1.56384$ | $v_{d6} = 60.70$ |
| $r_{11} = -26.479$ (Aspheric) | $d_{11} = 0.80$ | | |
| $r_{12} = -20.613$ | $d_{12} = 1.20$ | $n_{d7} = 1.80518$ | $v_{d7} = 25.43$ |
| $r_{13} = 34.024$ | $d_{13} = 3.98$ | $n_{d8} = 1.69680$ | $v_{d8} = 55.53$ |
| $r_{14} = -14.224$ | $d_{14} =$ (Variable) | | |
| $r_{15} = -56.860$ (Aspheric) | $d_{15} = 3.85$ | $n_{d9} = 1.80518$ | $v_{d9} = 25.43$ |

-continued

| | | | |
|---|---|---|---|
| $r_{16} = -23.307$ | $d_{16} = 2.95$ | | |
| $r_{17} = -12.861$ (Aspheric) | $d_{17} = 1.85$ | $n_{d10} = 1.72916$ | $v_{d10} = 54.68$ |
| $r_{18} = 71.092$ | | | |

| Zooming Spaces | | | |
|---|---|---|---|
| f | 39.00 | 87.00 | 195.00 |
| $d_5$ | 4.00 | 14.54 | 22.38 |
| $d_{14}$ | 17.97 | 7.59 | 1.00 |

Aspherical Coefficients

Figure 4:
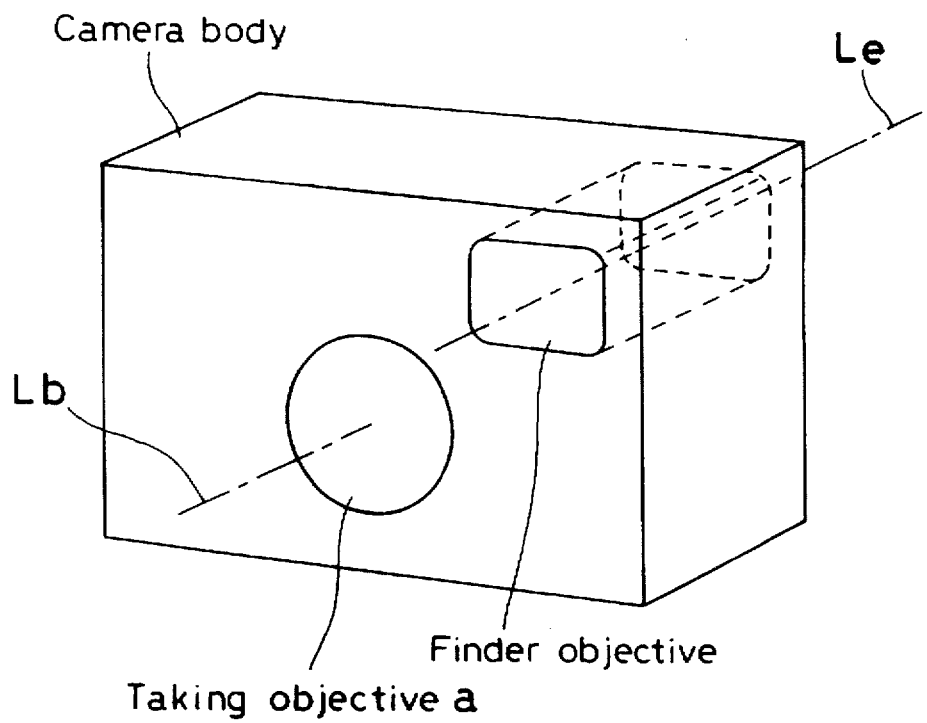
FIG. 4 is a perspective schematic of a compact camera with the present zoom lens system built in it.
Figure 5:
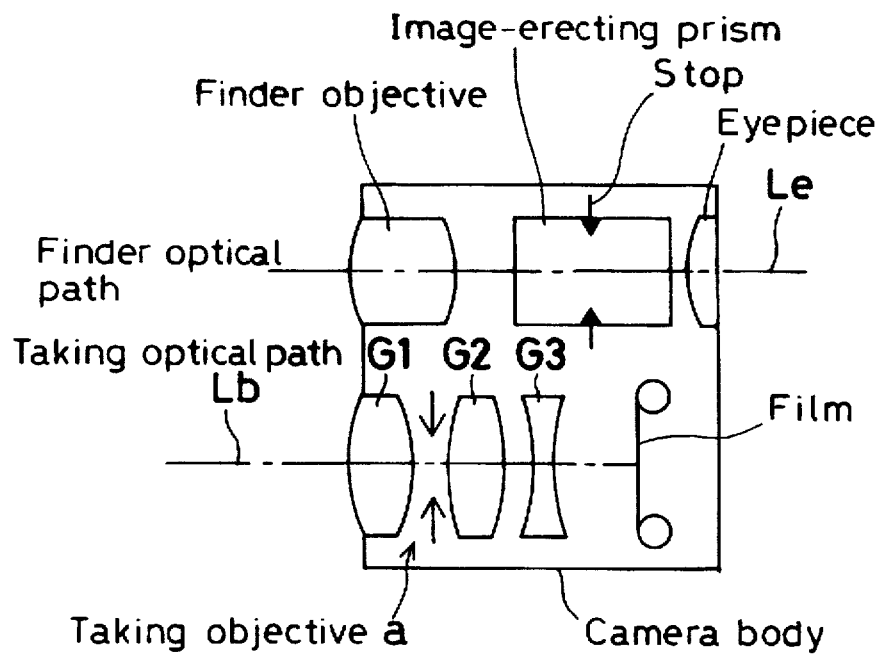
FIG. 5 is a perspective schematic of a compact camera with the present zoom lens system built in it.

7th surface $K = 0.0000$
$A_4 = 3.7238 \times 10^{-7}$
$A_6 = -2.4579 \times 10^{-9}$
$A_8 = 4.3250 \times 10^{-9}$
$A_{10} = 3.4388 \times 10^{-10}$ 10th surface $K = -3.6504$
$A_4 = -4.1257 \times 10^{-5}$
$A_6 = 2.5468 \times 10^{-6}$
$A_8 = -9.4561 \times 10^{-8}$
$A_{10} = -1.0409 \times 10^{-10}$ 11th surface $K = -0.1619$
$A_4 = 1.3645 \times 10^{-5}$
$A_6 = 3.5216 \times 10^{-6}$
$A_8 = -1.3813 \times 10^{-7}$
$A_{10} = 9.4317 \times 10^{-10}$ 15th surface $K = 0.6328$
$A_4 = 2.5792 \times 10^{-5}$
$A_6 = -1.4904 \times 10^{-7}$
$A_8 = -8.2126 \times 10^{-11}$
$A_{10} = 0$ 17th surface $K = -0.8135$
$A_4 = -3.7173 \times 10^{-5}$
$A_6 = 3.9274 \times 10^{-7}$
$A_8 = -6.4019 \times 10^{-10}$
$A_{10} = 0$
(1) $f_w/r_1 = -1.128$
(2) $f_1/f_a = -1.116$ Each of the present zoom lens systems as described above and illustrated in the drawings may be used as a taking objective a in a compact camera as shown sectionally and perspectively in FIGS. 4 and 5, respectively, in which Lb represents a taking optical path and Le a finder optical path arranged parallel therewith. A subject's image is observed through a finder comprising a finder objective, an image-erecting prism, a stop and an eyepiece, and is formed on film through the taking objective a.

According to the present invention as described above and illustrated in the drawings, a three-lens-group zoom lens system having a high zoom ratio is provided, which comprises, in order from an object side, a first lens group having positive refracting power, a second lens group having positive refracting power and a third lens group having negative refracting power and in which, in zooming from a wide-angle side to a telephoto side, an air separation between the first and second lens groups increases while an air separation between the second and third lens groups decreases, characterized in that the first lens group comprises, in order from the object side, a double concave lens, a positive lens and a positive lens, three lenses in all. The thus achieved zoom lens system, albeit having a zoom ratio of 3.5 or even more, is compact, well corrected for various aberrations including chromatic aberration and distortion, and excellent in the ability to form images.

The entirety of JP-7-185872 filed on Jul. 21, 1995, from which priority under 35 USC 119 is claimed, is incorporated herein by reference.

What we claim is:

1. A three-lens-group zoom lens system comprising, in order from an object side:

a first lens group having positive refracting power;

a second lens group having positive refracting power; and a third lens group having negative refracting power, wherein in zooming from a wide-angle end to a telephoto end, an air separation between the first and second lens groups increases while an air separation between the second and third lens groups decreases, a zoom ratio from said wide-angle end to said telephoto end exceeds 3.5, and said first lens group consists of, in order from the object side, a first subgroup consisting of a cemented lens of a double concave lens and a double convex lens, and a second subgroup consisting of a double convex lens, three lenses in all.

2. A three-lens-group zoom lens system comprising, in order from an object side:

a first lens group having positive refracting power;

a second lens group having positive refracting power; and a third lens group having negative refracting power, wherein in zooming from a wide-angle end to a telephoto end, an air separation between the first and second lens groups increases while an air separation between the second and third lens groups decreases, a zoom ratio from said wide-angle end to said telephoto end exceeds 3.5, said first lens group consists of, in order from the object side, a first lens that is a double concave lens, a second lens that is a positive lens and a third lens that is a positive lens, three lenses in all, and satisfies the following conditions (1) and (2):

$$-2.0 < f_w/r_1 < -0.5 \quad (1)$$

$$-2.0 < f_1/f_a < -0.2 \quad (2)$$

wherein $f_w$ is a composite focal length of the overall system at a wide-angle end, $r_1$ is a radius of curvature of a surface of said first lens that is located on the object side, $f_1$ is a composite focal length of the first lens group, and $f_a$ is a composite focal length of the double concave lens that is the first lens and the positive lens that is the second lens in the first lens group, the second lens in said first lens group consists of a double convex lens, and the first and second lenses in said first lens group consist of a cemented lens.

3. A three-lens-group zoom lens system comprising, in order from an object side:

a first lens group having positive refracting power;

a second lens group having positive refracting power; and a third lens group having negative refracting power, wherein in zooming from a wide-angle end to a telephoto end, an air separation between the first and second lens groups increases while an air separation between the second and third lens group decreases, a zoom ratio from said wide-angle end to said telephoto end exceeds 3.5, said first lens group consists of, in order from the object side, a first lens that is a double concave lens, a second lens that is a positive lens and a third lens that is a positive lens, three lenses in all, and satisfies the following conditions (1) and (2):

$$-2.0 < f_w/r_1 < -0.5 \quad (1)$$

$$-2.0 < f_1/f_a < -0.2 \quad (2)$$

wherein $f_w$ is a composite focal length of the overall system at a wide-angle end, $r_1$ is a radius of curvature of a surface of said first lens that is located on the object side, $f_1$ is a composite focal length of the first lens group, and $f_a$ is a composite focal length of the double concave lens that is the first lens and the positive lens that is the second lens in the first lens group, the second lens in said first lens group consists of a double convex lens, the third lens in said first lens group consists of a double convex lens, and the first and second lenses in said first lens group consist of a cemented lens.

4. A three-lens-group zoom lens system comprising, in order from an object side:

a first lens group having positive refracting power;

a second lens group having positive refracting power; and a third lens group having negative refracting power wherein in zooming from a wide-angle end to a telephoto end, an air separation between the first and second lens groups increases while an air separation between the second and third lens group decreases, a zoom ratio from said wide-angle end to said telephoto end exceeds 3.5, said first lens group consists of, in order from the object side, a first lens that is a double concave lens, a second lens that is a positive lens and a third lens that is a positive lens, three lenses in all, and satisfies the following conditions (1) and (2):

$$-2.0 < f_w/r_1 < -0.5 \quad (1)$$

$$-2.0 < f_1/f_a < -0.2 \quad (2)$$

wherein $f_w$ is a composite focal length of the overall system at a wide-angle end, $r_1$ is a radius of curvature of a surface of said first lens that is located on the object side, $f_1$ is a composite focal length of the first lens group, and $f_a$ is a composite focal length of the double concave lens that is the first lens and the positive lens that is the second lens in the first lens group, and the third lens in said first lens group consists of a double convex lens and wherein the first and second lenses in said first lens group consist of a cemented lens.

5. A three-group zoom lens system comprising, in order from an object side thereof:

a first lens group having positive refracting power;

a second lens group having positive refracting power; and a third lens group having negative refracting power, wherein upon zooming from a wide-angle end to a telephoto end, an air separation between the first and second lens groups increases and an air separation between the second and third lens groups decreases, said first lens group consists of, in order from the object side, a first sub-group sandwiched between air layers and a second sub-group sandwiched between air layers, said first sub-group consisting of a doublet of a double-concave lens and a double-convex lens, and said second sub-group consisting of a positive lens, and said first lens group, said second lens group and said third lens group are all moved toward said object side from said wide-angle end to said telephoto end, so that a zoom ratio exceeding 3.5 is achieved.

6. The zoom lens system according to claim 5, wherein said second lens group has a stop that is moved together with said second lens group toward said object side upon zooming from said wide-angle end to said telephoto end.

7. The zoom lens system according to claim 6, wherein said stop is located on an object side of said second lens group.

8. The zoom lens system according to claim 5, wherein said second sub-group in said first lens group has a double-convex lens shape.

9. The zoom lens system according to claim 6, wherein said second lens group consists of five lenses alone.

10. The zoom lens system according to claim 9, wherein said second lens group consists only of two doublets and one single lens.

11. The zoom lens system according to claim 10, wherein said one single lens is a positive lens.

12. The zoom lens system according to claim 11, wherein said one single lens is a double-convex lens.

13. The zoom lens system according to claim 10, wherein said two doublets are each constructed by cementing together a negative lens and a positive lens.

14. The zoom lens system according to claim 13, wherein said two doublets are each constructed by cementing a negative lens on said object side to a positive lens on an image side of said zoom lens system.

15. The zoom lens system according to claim 6, wherein said third lens group has only one intermediate air layer between an air layer on said object side and an air layer on an image side of said zoom lens system.

16. The zoom lens system according to claim 15, wherein said intermediate air layer has a meniscus shape which is convex on said image side.

17. The zoom lens system according to claim 16, wherein said third lens group consists only of one positive lens located between said intermediate air layer and said object side.

18. The zoom lens system according to claim 17, wherein said one positive lens located between said intermediate air layer and said object side in said third lens group is an aspheric lens having an aspheric surface.

19. The zoom lens system according to claim 18, wherein said one positive lens located between said intermediate air layer and said object side in said third lens group has a meniscus shape which is convex on said image side.

20. The zoom lens system according to claim 16, wherein said third lens group has a double-concave lens between said intermediate air layer and said image side.

21. The zoom lens system according to claim 10, wherein said one single lens in said second lens group is an aspheric lens having an aspheric surface.

22. The zoom lens system according to claim 1 or 5, which satisfies the following condition (1):

$$-2.0 < f_w/r_1 < -0.5 \tag{1}$$

where $f_w$ is a composite focal length of said zoom lens system at said wide-angle end, and $r_1$ is a radius of curvature of a surface in said first lens group, said surface being closest to said object side.

* * * * *